Aug. 31, 1926.
1,598,192
C. L. SEYMOUR ET AL
MOTOR CONTROL SYSTEM
Filed Sept. 15, 1921
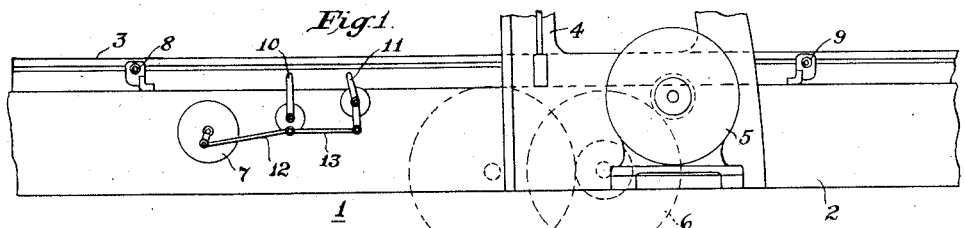
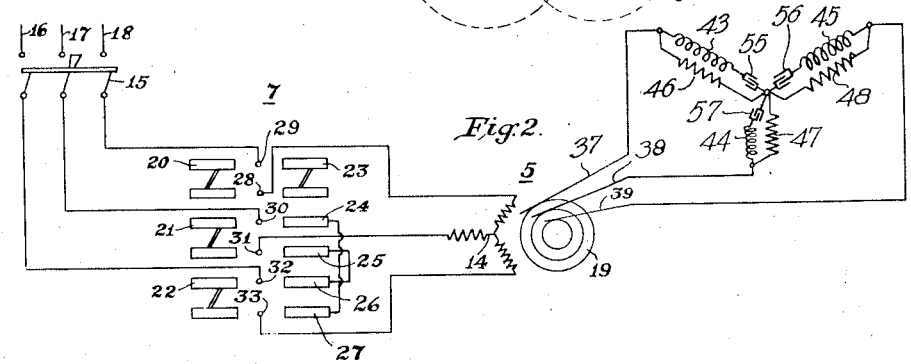
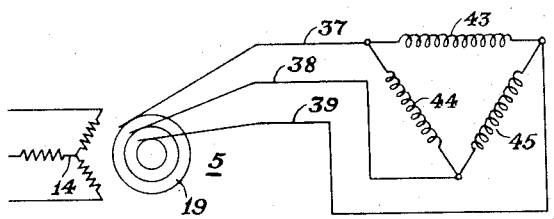
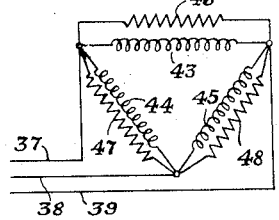
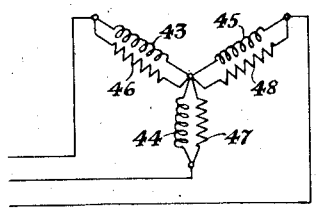
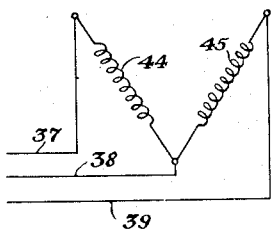
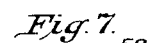
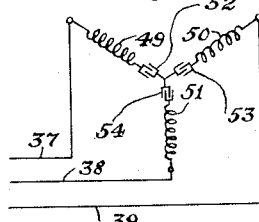
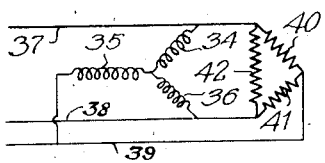
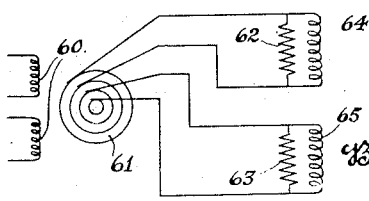
Inventors
C. L. Seymour
and R. C. Deale
By Wayne B Wells
Attorney.

Patented Aug. 31, 1926.

1,598,192

UNITED STATES PATENT OFFICE.

CHESTER L. SEYMOUR, OF BABYLON, NEW YORK, AND ROBERT C. DEALE, OF PLAINFIELD, NEW JERSEY, ASSIGNORS TO NILES-BEMENT-POND COMPANY, OF NEW YORK, N. Y., A CORPORATION OF NEW JERSEY.

MOTOR-CONTROL SYSTEM.

Application filed September 15, 1921. Serial No. 500,997.

Our invention relates to control systems for governing the operation of planers, drill presses and other machine tools.

One object of our invention is to provide a machine tool with a control system that shall so govern an alternating current motor by means of impedance elements inserted in the secondary circuit as to limit the current during starting, to gradually accelerate the motor to full speed, and to effect substantially short-circuit conditions in the secondary circuit when the motor is operating at normal speed.

Another object of our invention is to provide a machine tool with a control system of the above indicated character that shall govern an induction motor by so short circuiting the secondary winding through impedance elements as to permit the free flow of current through the secondary circuit when the motor is operating at normal speed, the impedance elements being of such value as to prevent an excessive current flow during starting and to develop a relatively high starting torque.

A further object of our invention is to provide a control system for a machine tool and particularly for a planer that shall comprise an induction motor, the circuit connections of which are automatically reversed by the planer table at each end of the stroke, and means comprising impedance elements for so governing the secondary circuit of the motor as to offer relatively large opposition to the high frequency current flowing through the secondary circuit during reversing and starting and to offer substantially little opposition to the low frequency current flowing through the secondary circuit when the motor is operating at normal speed.

At the present time it is customary to start an induction motor of the wound rotor type by varying resistors in the secondary circuit. When starting the motor a relatively high resistance is included in the secondary circuit and either manual or automatic means is provided for short circuiting the resistance as the motor is accelerated to full speed. It is necessary to provide resistors in the secondary circuit during the starting operation in order to prevent an excessive rush of current through the motor and to increase the power component of the current flowing so that the starting torque may be relatively large. However, an automatic controller for short circuiting the resistors in the secondary circuit of an induction motor is somewhat bulky and expensive and has various contacts and moving parts to be maintained in working condition.

In a control system constructed in accordance with our invention the acceleration of the motor is governed solely by impedance elements which are permanently connected in the secondary circuit of the motor. In the case of a three-phase induction motor, the secondary circuit is closed through resistance elements which may be connected either in delta or star arrangement as desired. Such resistance elements are shunted by means of inductive elements of such value as to practically short circuit the secondary winding during reversing conditions. Moreover, in many cases, it may be desirable to also connect capacity elements in circuit with the resistors and the inductive elements.

During the starting of an induction motor, the frequency developed in the secondary circuit approaches the frequency supplied to the primary circuit from the source of supply. The frequency developed in the secondary circuit is gradually lowered during acceleration until a minimum low frequency is reached when the motor is operating at normal speed. In the construction above set forth, it is apparent that the inductive elements offer a relatively large opposition to the high frequency current during starting, and consequently the majority of the starting current passes through the resistors. Thus, the motor is started with a relatively high torque while using a relatively small starting current. The frequency of the secondary current is lowered in accordance with the acceleration of the motor and accordingly the opposition of the inductive elements to the secondary current is lowered in accordance with the increase in speed of the motor. Such action by the impedance elements permits a gradual acceleration of the motor to full speed. When the motor is operated at normal speed, the frequency of the secondary current is very low and accordingly the inductive elements offer little or no opposition to the flow of such current. Consequently, when the motor is operating at normal speed the resistors carry little secondary current and the secondary circuit is substantially short circuited through the inductive elements. In many cases, it may be desirable to include capacity elements in the secondary circuit in order to make the reactance portion of that circuit resonant to the frequency developed when the motor is operating at normal speed, and consequently still further reduce the current through the resistors while the motor is running.

The control systems heretofore provided for operating drill presses and particularly for operating planers have been connected to direct-current supply circuits. If only an alternating-current supply circuit were available, it has generally been customary to operate the planer by direct current supplied by a motor-generator set which in turn was connected to the alternating-current supply circuit. In operating a planer, it is necessary to reciprocate a work-carrying table at a relatively rapid rate. When the planer table is directly geared to an electric motor, it is necessary to brake the motor and reverse its direction of rotation at each end of the planer stroke. A direct-current motor can be quickly stopped by completing a dynamic-braking circuit through it. Moreover, after the movement of the motor and the table is stopped, such motor can be quickly accelerated in a reverse direction. Accordingly, machine tools have heretofore been generally operated by direct-current motors.

In a planer control system constructed in accordance with our invention, the reciprocating member directly controls an induction motor and the direction of rotation of the motor is quickly reversed. A pilot switch is automatically operated at each end of the planer stroke for reversing the circuit connections to the induction motor. The secondary winding of the motor is connected to impedance elements which are proportioned in accordance with the frequency developed in the secondary winding at normal speed. Such impedance elements oppose the flow of high frequency currents through the secondary winding and offer little opposition to the flow of low frequency current. Upon reversal of the motor connections at the end of the planer stroke, the current flowing through the secondary circuit will have a frequency approaching twice the supply circuit frequency. The impedance elements offer great opposition to the flow of current having such a high frequency and accordingly prevent abnormal current conditions which would be injurious to the motor windings. Inasmuch as a rotating field is provided, which opposes the present direction of rotation of the rotor, the motor is quickly stopped and operated in a reverse direction. At the instant the direction of rotation of the motor is reversed, the frequency of the current flowing in the secondary winding is reduced to substantially the frequency of the supply circuit. Inasmuch, as the impedance elements include resistance elements which are shunted by inductance elements, it is apparent sufficient current is permitted to flow through the secondary winding to insure a good starting torque in the reverse direction. When the motor is operated at normal speed, substantially short circuit conditions are obtained in the secondary winding.

In the accompanying drawing:

Figure 1 is a partial side elevational view of a planer adapted to be operated in accordance with our invention.

Fig. 2 is a diagrammatic view of a preferred form of control system embodying our invention.

Figs. 3 to 9 inclusive are diagrammatic views of modifications of our invention.

Referring to Fig. 1 of the drawing, a planer 1 having a bed 2 is adapted to be operated by a control system constructed in accordance with our invention. Although a planer has been illustrated in the drawing, it is to be understood that any other similar machine tool, for example a radial drill press, may be similarly controlled. A work carrying table 3, which is mounted on the bed 2, is adapted to be reciprocated longitudinally of the bed. Uprights 4 are attached to the bed 2 for supporting a cross rail and tool-carrying cross heads (not shown).

An induction motor 5, which is connected to the table 3 by suitable gearing 6, serves to effect reciprocating movement of the table. A pilot switch 7 of any suitable type, which is mounted on the bed 2, is operated by the table 3 for governing the operation of the motor 5. Two adjustable dogs 8 and 9, which are mounted on the table 3, serve to effect operation of the pilot switch 7 at each end of the planer stroke. The dogs 8 and 9, respectively, engage levers 10 and 11 which in turn are directly connected to the pilot switch 7 by means of links 12 and 13. Near the end of the planer stroke toward the right, as shown in the drawing, the dog 8 engages the lever 10 for so moving the pilot switch 7 as to reverse the direction of rotation in the induction motor 5. The planer table is then moved toward the left and when near the end of the movement in such direction, the dog 9 engages the lever 11 for again operating the pilot switch 7 to reverse the direction of rotation of the motor.

Referring to Fig. 2 of the drawing, a preferred system of control for the motor 5 is illustrated. The motor 5 has been illustrated as a three-phase induction motor having a wound rotor although it might be any similar motor having a wound rotor. The primary winding 14 of the motor is connected through the pilot switch 7 and a line switch 15 to a three-phase supply circuit comprising conductors 16, 17 and 18. The rotor 19 of the motor is connected to impedence elements in a manner to be hereinafter set forth.

The pilot switch 7 comprises contact segments 20 to 27, inclusive, which are adapted to engage stationary contact members 28 to 33, inclusive, according to the operative position of the switch. When the pilot switch 7 is moved toward the left, as shown on the drawing, the supply conductor 18 is connected to the primary winding through the contact terminals 28 and 29 which are bridged by the contact segment 23. The supply conductor 17 is connected to the primary winding through the contact members 30 and 33, which are bridged by the contact segments 24 and 27, and the supply conductor 16 is connected to the primary winding through the contact segments 31 and 32 which are bridged by the contact segments 25 and 26. When the position of the pilot switch is reversed, the connection of the supply conductors 16 and 17 to the primary circuit is reversed to effect rotation of the motor in a reverse direction. In the reverse position of the pilot switch, the supply conductor 18 is connected to the primary circuit through the contact members 28 and 29 which are bridged by the contact segment 20. The supply conductor 17 is connected to the primary winding through the contact members 30 and 31, which are bridged by the contact segment 21, and the supply conductor 16 is connected to the primary winding through the contact members 32 and 33 which are bridged by the contact segment 22.

The secondary system shown in Fig. 2 is partly similar to the system shown in Fig. 5 (to be described hereinafter) with the exception that three capacity elements 55, 56 and 57 are respectively connected in series with the inductance elements 43, 44 and 45. In the system disclosed in Fig. 2, the resistance elements provide for starting the motor with a reasonably large torque and the remaining impedance elements serve to permit the tuning of the circuit to the frequency that is developed when the motor is operating at full speed. Thus, short-circuit conditions are effected in the secondary circuit.

Referring to Fig. 3 of the drawing, three inductance elements 43, 44 and 45, which are connected in delta arrangement, are joined to the rotor of the motor 5 by the conductors 37, 38 and 39. Upon starting the motor 5 with such an arrangement of inductance elements connected to the rotor, the starting current is cut down considerably. However, such a connection tends to reduce the starting torque and lowers the power factor. In operating an induction motor, it is apparent the frequency developed in the rotor or secondary winding approaches the frequency supplied to the primary winding upon starting and when the motor is operated at normal speed the frequency of the current developed in the secondary winding is reduced to a very small per cent of the frequency maintained in the primary winding. The inductance elements 43, 44 and 45 offer relatively great opposition to the flow of current in the secondary winding upon starting of the motor. However, as the speed of the motor increases, such opposition to the flow of current through the secondary winding is gradually reduced until the motor is operating at normal speed when very small opposition is offered to the current flow. In other words, the inductance elements should be of such size as to practically effect short circuit conditions in the secondary circuit when the motor is operating at normal speed.

Although it is possible to obtain many of the operative features of the automatic controller, without moving parts, by means of the inductance elements alone, the starting torque is not as high as desirable in most cases and the power factor is lower than is customarily required. In order to improve the operation of the system disclosed in Fig. 3 the resistance elements 46, 47 and 48 are added and shunted by inductance elements 43, 44 and 45 as shown in Fig. 4 of the drawing. The introduction of such resistance elements in the secondary circuit supplies a path during starting of the motor for current having a high power component. Consequently, good starting torque is produced by reason of the current which passes through the resistance elements. Moreover as the motor accelerates and the frequency of the secondary circuit current is reduced, a greater amount of current passes through the inductance elements until at normal-speed conditions very little current flows through the resistance elements and the inductance elements effect practically short-circuit conditions in the secondary circuit.

The above arrangement gradually reduces the opposition to current flow in the secondary circuit as the motor accelerates and produces a much smoother acceleration than can be effected by an automatic controller which successively short circuits portions of a resistor in steps. In operating control systems in accordance with our invention, it is found that the frequency of the current in the secondary winding is approximately 6% of the line frequency when the motor is operating at normal speed. Moreover, practically all the secondary current passes through the inductance elements.

The system shown in Fig. 5 is similar to the system shown in Fig. 4 with the exception that the inductance and resistance elements are connected in star arrangement in place of in delta arrangement as shown in Fig. 4. The system shown in Fig. 6 is similar to the system shown in Fig. 3 with the exception that only two inductance elements 44 and 45 are connected to the rotor by the conductors 37, 38 and 39. The system shown in Fig. 6 operates in a manner similar to the system shown in Fig. 3.

In Fig. 7 of the drawing, three inductance elements 49, 50 and 51 are connected to the rotor 19 by the conductors 37, 38 and 39. The three inductance elements are connected in star arrangement and three condensers 52, 53 and 54 are respectively connected in series with the inductance elements 49, 50 and 51. The system shown in Fig. 7 permits the tuning of the secondary circuit very closely to the frequency developed in such circuit at normal motor speed. In such arrangement practically short circuit conditions are effected in the secondary circuit when the motor is operating at full speed.

Referring to Fig. 8, three inductance elements 34, 35 and 36, which are connected in star arrangement, are connected to the rotor 19 by means of conductors 37, 38 and 39. Moreover, three resistance elements 40, 41 and 42, which are connected in delta arrangement, are connected to the rotor 19 by means of the conductors 37, 38 and 39. It will be noted the resistance element 42 is shunted by the inductance elements 34 and 36, the resistance element 40 is shunted by the inductance elements 34 and 35 and the resistance element 41 is shunted by the inductance elements 35 and 36.

Referring to Fig. 9 of the drawing, a modification is illustrated wherein our invention is applied to a two-phase induction motor. In this regard, it may be noted that our invention is equally applicable to an induction motor connected to any suitable alternating-current supply circuit. In the system shown in Fig. 9, a two-phase primary winding 60 is associated with a two-phase wound rotor 61. The rotor winding is connected in circuit with resistance elements 62 and 63 which are respectively shunted by inductance elements 64 and 65. The system shown in Fig. 9 operates in a manner similar to the systems above described.

In a planer control system constructed in accordance with our invention, the movement of the planer table 3 is quickly stopped and a stroke in a reverse direction is immediately started. The induction motor which effects the reciprocating movement of the planer table is efficiently braked to stop the movement of the work carrying table at each end of the planer stroke and the motor is quickly accelerated in a reverse direction to continue the reciprocating movement of the work carrying table. During normal speed conditions, the frequency of the current developed in the secondary winding of the induction motor is very low and substantially short-circuit conditions are obtained in the secondary winding. However, near each end of the planer stroke, a pilot switch 7 reverses the circuit connections of the motor 5 to the supply conductors. Immediately a current is developed in the secondary winding of the induction motor having a frequency substantially double the supply circuit frequency. A rotating field is developed in the induction motor which opposes the direction of rotation of the rotor and accordingly the motor is quickly stopped and operated in a reverse direction. The impedance elements in the secondary winding of the motor, being tuned to a current having a low frequency, prevent an abnormal current flow through the motor at the time the circuit connections of the motor to the supply circuit are reversed. During the accelerating of the motor in a reverse direction, the resistance elements carry a large per cent of the starting current and permit the starting of the motor with a relatively large torque. The current flow through the inductance elements is increased in accordance with the increase in speed of the motor until at normal speed practically no current goes through the resistance elements. Moreover, by so adjusting the impedance elements as to tune the circuit to the frequency obtained when the motor is operating at normal speed, it is possible to obtain practically short-circuit conditions in the secondary circuit. Furthermore it is to be understood that the impedance elements may be either mounted on the rotor or connected to it through slip rings.

Modifications in the system and in the arrangement and location of parts may be made within the spirit and scope of our invention and such modifications are intended to be covered by the appended claim.

What we claim is:

In a planer control system, the combination with a three-phase induction motor adapted to be connected to a three-phase supply circuit, a planer table, and means automatically operated by the planer table for reversing the connections of the motor to the supply circuit at each end of the planer stroke, of means comprising capacity, inductance and resistance elements in the secondary circuit for limiting the current flow during reversal of the motor connections, for limiting the starting current to permit gradual acceleration of the motor and for substantially effecting short-circuit conditions in the secondary circuit when the motor is operating at normal speed.

In testimony whereof, we hereto affix our signatures.

ROBERT C. DEALE.
CHESTER L. SEYMOUR.